(No Model.)
G. A. GOODRICH.
ROTATING PIGEON HOLE CASE.
No. 408,230. Patented Aug. 6, 1889.
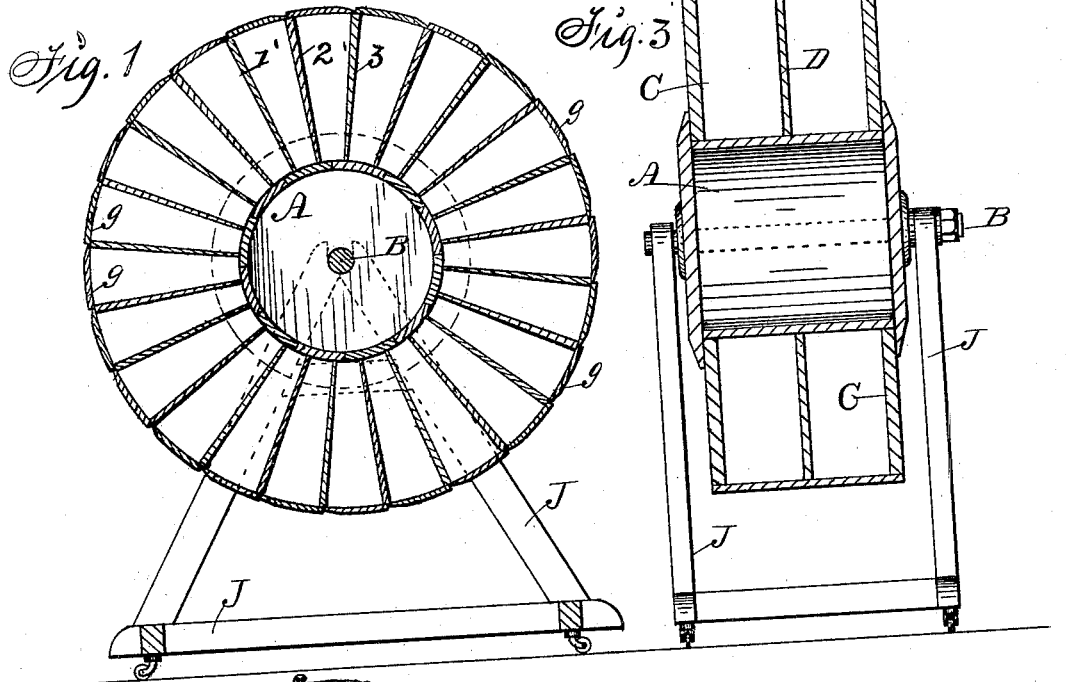
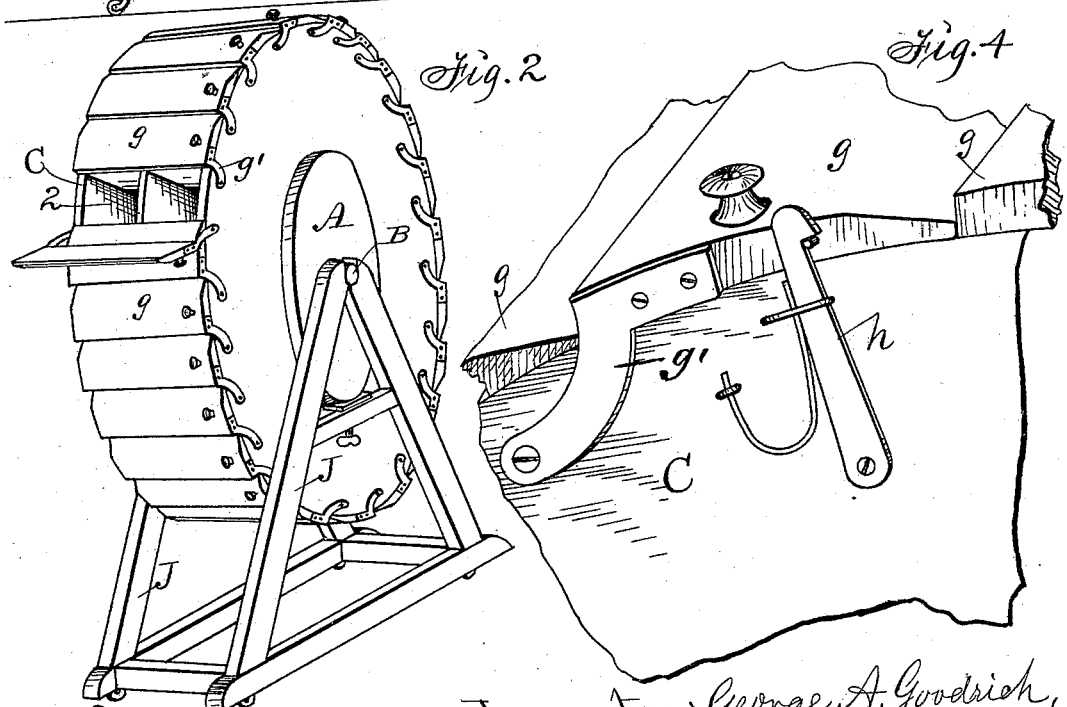

(No Model.) 2 Sheets—Sheet 1.
W. W. GRISCOM.
MEANS FOR PROPELLING VEHICLES BY SECONDARY BATTERIES.
No. 408,231. Patented Aug. 6, 1889.